April 4, 1961     R. G. HOOF     2,977,812
ACTUATOR WITH DITHER IN NEUTRAL
Filed Nov. 10, 1958
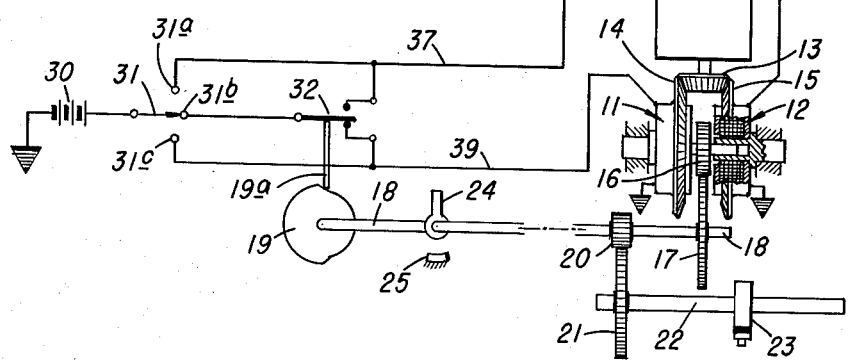
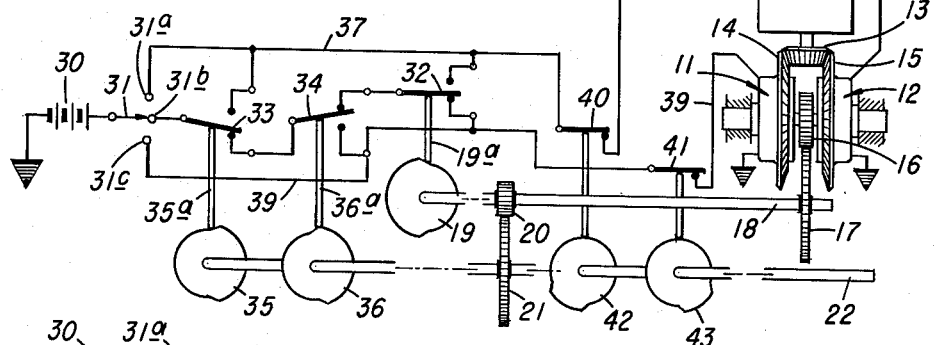
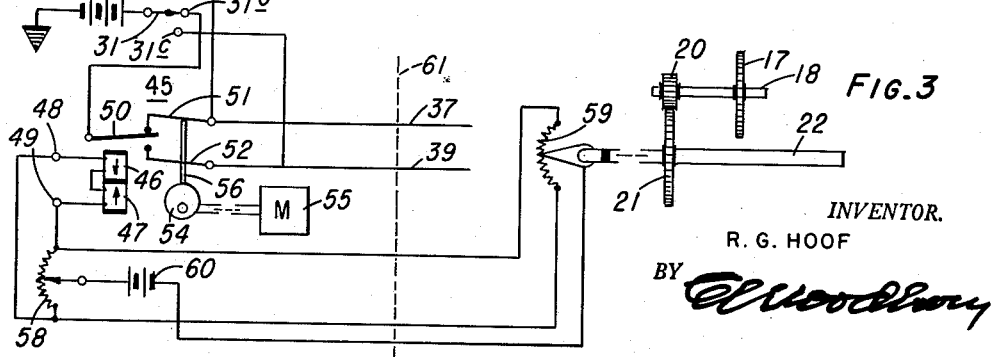
INVENTOR.
R. G. HOOF
ATTORNEY

United States Patent Office 2,977,812
Patented Apr. 4, 1961

2,977,812
ACTUATOR WITH DITHER IN NEUTRAL
Robert G. Hoof, Glendale, Calif., assignor to The Bendix Corporation, a corporation of Delaware
Filed Nov. 10, 1958, Ser. No. 773,082
9 Claims. (Cl. 74—322)

This invention relates to power-driven actuators of the type employed to vary the angular position of devices such as rudders, stabilizing fins, etc. A commonly used actuator consists of a small, high-speed, reversible electric motor coupled by a speed-reducing gear train to an output shaft connected to the device to be actuated.

Frequently the rudder or other actuated device has a neutral position in which it should be retained with considerable accuracy, except when it is purposely deflected therefrom. Systems have been developed for maintaining the driving or input shaft of the gear train accurately in a predetermined neutral position, but practical gear trains have some backlash, permitting the driven or output shaft that is connected to the device to deviate from its neutral position because of reaction forces of the device or because of the particular direction of the last rotation of the motor into neutral position. Furthermore, even if a speed-reducing mechanism having no backlash is employed, it is difficult and expensive to manufacture control switches responsive to shaft rotation that will operate to stop a shaft exactly at the same point in both directions of rotation.

An object of the invention is to provide a simple and practicable actuator producing an effect equivalent to accurate neutral positioning.

Another object of the invention is to reduce or eliminate the bad effects of backlash in an actuator.

Another object is to provide a practicable and inexpensive, rugged actuator having a very rapid response and having the resultant effect of accurate neutral positioning.

In accordance with the invention, the "effect" of accurate neutral positioning is produced by dithering the input shaft of the actuator gear train rapidly back and forth through an angle centered on the neutral position. Since the moving elements are being substantially constantly accelerated, first in one direction and then in the other, the dither angle of the output shaft is centered on its neutral position if the dither rate and magnitude and the inertia of the parts, or the friction of the parts, are sufficiently great relative to any live load force urging the output shaft out of neutral position.

It is essential that the inertia forces and/or the friction forces exceed any dynamic load forces applied to the output shaft for the dither to reduce or eliminate neutral position errors caused by backlash. However, the inertia forces are determined not only by the inertia of the parts, but by the rate at which they are accelerated, and if the dither forces produce very rapid acceleration, the inertial forces can be made to exceed the live load forces in many applications. If the inertial forces are insufficient to overcome the live load forces, the frictional resistance of the output shaft may be increased by a drag brake.

In accordance with the invention, high acceleration forces are produced by selectively driving the input shaft in either direction by two clutches from two drive members continuously rotating in opposite directions.

Assuming that the inertia and/or friction forces do exceed the dynamic load forces, the following effects are obtained by the use of dithers of various magnitudes.

If the dither angle is less than the backlash angle, the departure from neutral position in either direction permitted by the backlash is reduced by the extent of the angle of dither, but there is still an angular range (centered at neutral) within which the position of the output shaft is not controlled.

If the dither angle is equal to the backlash angle, the output shaft is alternately urged into neutral position from opposite directions so that it is centered in neutral position by one or the other of the first two dither movements, and thereafter maintained in neutral position by the succeeding dither movements.

If the dither angle is greater than the backlash angle, the output shaft is alternately urged from opposite directions into, through, and equal angles beyond neutral position, so that it dithers through an angle centered at neutral and having a magnitude equal to the difference between the dither angle and the backlash angle.

A full understanding of the invention may be had from the following detailed description with reference to the drawing, in which:

Fig. 1 is a schematic diagram of a simple actuator incorporating the invention and having relatively small angular range of movement of the output shaft.

Fig. 2 is a schematic diagram of a more elaborate actuator incorporating the invention and providing a larger angular range of movement of the output shaft.

Fig. 3 is a schematic diagram of a third system incorporating the invention.

Referring to Fig. 1, a constantly running motor 10 drives two coaxial clutch solenoids 11 and 12 in opposite directions through bevel gears 13, 14, 15 on the motor and solenoids, respectively. A paramagnetic clutch disk 16 is mounted between the two solenoids for rotary and axial movement, and has gear teeth on its periphery in driving engagement with a gear 17 on a high speed input shaft 18 which carries a switch-actuating cam 19 and a pinion 20. The pinion 20 meshes with a relatively large gear 21 on a shaft 22 to drive the latter at a lower speed, which may be approximately one-tenth the speed of the shaft 18. Shaft 22 constitutes the output shaft and may have a drag brake 23 thereon for a purpose to be described later. The shaft 18 carries a stop arm 24 which engages a fixed stop 25 to limit the rotation of the cam 19 to somewhat less than 360°.

The energization of either of the rotating solenoids 11 and 12 pulls the clutch disk 16 into engagement therewith to rotate the clutch disk in direction determined by which solenoid is energized. The solenoids are selectively energized from a current source 30 by a control circuit comprising an externally controlled switch 31 and a switch 32 automatically actuated by the cam 19.

The over-all function of the control circuit is to energize the clutch solenoids 11 and 12 in such manner as to perform any one of the following operations:

(1) Rotate the output shaft 22 from a neutral position in one direction through a fixed angle and hold it there;

(2) Rotate the output shaft 22 from a neutral position in the opposite direction through a fixed angle and hold it there;

(3) Rapidly oscillate the input shaft back and forth through a fixed small angle centered at the neutral position. This oscillation will hereafter be referred to as dither, and serves the purpose of insuring that the average or mean position of the output shaft will be the desired neutral position, despite unavoidable lost motion or backlash in the gear train between the clutch disk 16 and the output shaft, and despite movement of the disk 16 that otherwise might be produced by the load on the output shaft or by residual magnetism when both solenoids are de-energized.

The first operation is effected by moving the control switch 31 to contact 31a, thereby completing a circuit from source 30 to a bus 37 connected to the solenoid 12, which it will be assumed rotates clockwise (cw.), thereby driving the shaft 18 counterclockwise (ccw.) and the shaft 22 cw. This movement continues until the shaft 18 has rotated through a sufficient angle to cause the arm 24 to encounter the stop 25, whereupon the shaft 18 stops and the clutch slips.

The second operation is effected by moving the control switch 31 to the contact 31c, thereby completing a circuit from the source 30 to a bus 39 connected to the solenoid 11 which, it will be assumed, rotates ccw., thereby driving the shaft 18 cw. and the shaft 22 ccw. until the arm 24 again encounters the stop 25, stopping rotation of the shaft.

The foregoing operations are conventional in prior actuators.

Now assume that, following the first operation described above, the control switch 31 is moved to the contact 31b. Since cam 19 is displaced ccw. from neutral position, the switch 32 is in its lower position so that current is supplied to the bus 39 to energize the ccw. clutch solenoid 11 and drive the shaft 18 cw. back toward neutral position. Slightly before neutral position is reached, the cam follower 19a rides up on the rise of the cam 19 and, just beyond the midpoint of the rise, moves the switch 32 into its upper position, interrupting the connection between the source 30 and the solenoid 11, but completing a circuit from source 30 through the upper contact of switch 32 to energize the solenoid 12 and reverse the direction of movement of the shaft. Thereafter, the shaft 18 dithers rapidly back and forth through a small angle centered at the neutral position, as solenoids 11 and 12 are alternately energized by the switch 32. The dithering continues until the control switch 31 is moved off contact 31b onto contact 31a or 31c to de-energize the dithering circuit and continuously energize one of the solenoids 11 or 12, as previously described.

When the control switch 31 is moved from contact 31c to the neutral contact 31b, the same result is obtained, except that the cam 19 is initially in clockwise direction with respect to neutral, and it moves in counterclockwise direction into neutral position.

The magnitude of the angular oscillation of the shaft 18 during the dithering operation is several degrees, since the momentum of the rotating parts and clutch slippage produces some over-shooting beyond the range necessary to actuate the switch 32, but because of the speed reduction between shafts 18 and 22, the range of dithering oscillation of shaft 22 may be less than one degree. The theoretical dithering range of the output shaft (assuming no lost motion in the gear train) should be equal to or in excess of the actual lost motion, in order to effect full compensation of errors due to the lost motion. If the dither range equals the lost motion, the output shaft will remain substantially stationary in neutral position if the load connected thereto has substantial inertia and/or friction relative to any dynamic load forces tending to move it out of neutral position. If the dither range exceeds the lost motion or backlash, the output shaft will oscillate equal angles each side of neutral, and its means position will be neutral. If the dither is not rapid enough relative to the inertia of the parts, the drag brake 23 may be employed to hold the output shaft 22 in each extreme position of dither to which it is operated, and the shaft will remain on each side of the neutral position the same period of time.

The system of Fig. 1 is incapable of providing a large angular movement of the output shaft 22 without a corresponding increase in the angle of dither through the neutral position. Thus, if the ratio between gears 20 and 21 is reduced to increase the speed and range of movement of the output shaft 22, the range of dither motion would be proportionately increased.

Fig. 2 shows a further development of the system for providing greater angular range at the output shaft without excessive dither range. Elements in Fig. 2 corresponding to those in Fig. 1 bear the same reference numerals.

The system of Fig. 2 differs from Fig. 1 in the following respects:

(a) The addition of two dither limit switches 33 and 34 actuated by two cams 35 and 36 on the shaft 22.

(b) The addition of two limit switches 40 and 41 in the motor buses 37 and 39 for de-energizing the active clutch and stopping the output shaft 22 in its extreme position without employing the limit stop 24, 25 of Fig. 1. These limit switches 40 and 41 are actuated by cams 42 and 43 on the output shaft 22. Obviously, the limit switches 40 and 41 and cams 42 and 43 may be employed in place of the stop 24, 25 if desired, and vice versa, the stop 24, 25 may be employed in Fig. 2 in place of the limit switches. In some applications, the output shaft is retained in extreme position for such a short time that it is not objectionable to permit the clutch to slip. In other situations, the output shaft may be required to remain in limit position for a substantial time, and it would be undesirable to permit such long slippage of the clutch.

In Fig. 2, the first and second operations are effected in exactly the same manner described in connection with Fig. 1, except that the limit switch 40 terminates the shaft movement in the first operation, and the limit switch 41 terminates the shaft movement in the second operation.

The third, or neutral position, operation is effected in Fig. 2 as follows:

Assume that following the first operation described above, the control switch 31 is moved to the contact 31b. Since shaft 22 is displaced clockwise (cw.) from neutral position, switches 33 and 34 are in their lower positions, so that current is supplied to the bus 39 to energize the ccw. clutch solenoid 11 and drive the shaft 22 ccw. back toward neutral position. Slightly before neutral position is reached, the cam 36 shifts switch 34 into upper position, interrupting the direct connection between the source 30 and the solenoid 11, but completing a circuit from source 30 through the upper contact of switch 34 to the movable contact of switch 32 actuated by cam 19 on shaft 18, which rotates faster than shaft 22. Cam 19 is therefore traveling clockwise. Furthermore, cam 19 is so phased with respect to cam 36 that at the time switch 34 is moved into its upper position, the cam follower 19a is on the low dwell of cam 19, and switch 32 is in lower position to maintain the energizing circuit to solenoid 11, so that shaft 22 continues its ccw. movement toward neutral position, at which position the follower 19a is at a point on the rise on cam 19 where it actuates the switch 32 into upper position to de-energize solenoid 11 and energize solenoid 12 to reverse the direction of movement of the shaft. Thereafter, the shafts dither rapidly back and forth through a small angle centered at the neutral position as solenoids 11 and 12 are alternately energized by the switch 32. The dithering continues until the control switch 31 is moved off contact 31b onto contact 31a or 31c to de-energize the dithering circuit and continuously energize one of the solenoids 11 or 12, as previously described.

If the neutral position 31b is selected after the actuator has been driven to the other position by switch contact 31 having been placed in contact with terminal 31c, a similar sequence of events takes place under control of cam 35. Thus, as switch 31 is moved to position 31b, the cam followers 35a and 36a are on the high dwells of cams 35 and 36, respectively, and when switch 31 is moved to contact 31b, the bus 37 is energized over switches 31 and 33 to drive the shaft 22 clockwise until cam 35 actuates switch 33 into lower position, breaking the direct contact from the source 30 to the bus 37 and connecting it through switch 34 to the dithering switch 32, which is in its upper position because cam 35 is so phased with respect to cam 19 as to move switch 33 into the lower position while the follower 19a is on the high dwell of cam 19, which is now moving counter-clockwise in the actuator illustrated. Therefore, the solenoid 12 is maintained energized to continue rotating the cam 19 counter-clockwise into neutral position to actuate switch 32 into its lower position and start the dithering operation in the true neutral position of the actuator.

As in Fig. 1, the magnitude of the angular oscillation of the shaft 18 during the dithering operation is several degrees, since the momentum of the rotating parts and clutch slippage produces some over-shooting beyond the range necessary to actuate the switch 35, but because of the speed reduction between shafts 18 and 22, the range of dithering oscillation of shaft 22 may be less than one degree.

The cams 35 and 36 must be so phased relative to the cam 19 as to connect the switch contact 31b to the dithering switch 32, while the cam 19 is less than one-half revolution from its neutral position. Because of the speed reduction between shaft 18 and shaft 22, cam 35 may be phased to move switch 33 downward (during clockwise rotation of the cam) about two degrees ahead of neutral position, and cam 36 may be phased to move switch 34 upward (during ccw. rotation of the cam) about two degrees ahead of neutral position, making a total effective phase displacement between the two cams 35 and 36 of about four degrees.

Thus, cam 19 is effective within a small range of displacement equal to less than one revolution of the high-speed shaft 18, to energize the appropriate clutch to first restore the shafts to neutral position and thereafter dither them through neutral position, and cams 35 and 36 are effective within a large range of displacement to bring the shafts into the small range of the cam 19.

There is shown in Fig. 3 another way of applying the dither principle. Whereas in Figs. 1 and 2 the dithering mechanism is inactive when the output shaft is selectively moved out of neutral position, in Fig. 3 the dithering may be continuous.

In the system of Fig. 3, the elements 10—18, 20—22, and 30, 31, 37, 39 are the same as in Fig. 1 (the motor and clutch elements 10—16 not being shown in Fig. 3), but the apparatus for selectively energizing the buses 37 and 39 to produce dithering movement is quite different. This apparatus comprises a differential relay 45 having: differential windings 46 and 47 connected to terminals 48 and 49; an armature 50 responsive to differential energization of the windings 46 and 47; contacts 51 and 52 cooperating with the armature 50; a cam 54 constantly rotated by a motor 55, and a cam follower 56 for constantly oscillating the contacts 51 and 52.

In operation, when equal signal potentials are applied to the terminals 48 and 49, the armature 50 tends to remain in a neutral position just out of contact with both contacts 51 and 52 when the latter are in their neutral positions. Under these conditions, current from the source 30 is alternately applied over contact 31b of switch 31, armature 50, and contacts 51, 52, to the buses 37 and 39, respectively, for equal periods of time to dither the output shaft 22 about a neutral position, as previously described, in response to the rotation of the cam 54.

To shift the mean position of the output shaft 22 in one direction, different potentials are applied to the terminals 48 and 49, causing the armature 50 to tend to move up or down, dependent upon the polarity of the differential voltage between the terminals 48 and 49, and causing the armature to close on one of the contacts 51 or 52 longer than on the other during each dithering cycle of the cam 54. The resultant application of current to the buses 37, 39 for unequal periods shifts the mean position of the shaft, since the shaft dithers farther in one direction during each cycle than in the other.

Looked at in a different way, the armature 50 and contacts 51, 52, and the cam 54 generate in conjunction with the source 30 what may be considered as the equivalent of a square wave, the positive halves of which are applied to one of the buses 37, 39, to drive the output shaft 22 in one direction, and the negative halves of which are applied to the other bus to drive the output shaft 22 in the other direction. The control potential applied to the terminals 48, 49 time-modulates the square wave to lengthen the positive half waves and shorten the negative half waves, or vice versa.

The terminals 48 and 49 may be energized by a control circuit comprising an externally controlled potentiometer 58, a feedback potentiometer 59 driven by the output shaft 22, and a potential source 60. The potentiometers 58 and 59 are bridged across the terminals 48 and 49, and the source 60 is connected between the movable contacts of the two potentiometers. When the movable contacts of the two potentiometers are in corresponding positions, equal potentials are applied to the terminals 48 and 49.

In addition to the dithering effect of the movement of the continuously oscillating contacts 51, 52, a slower dithering is produced by the feedback circuit because of the rapid acceleration produced by the clutches. The rapid acceleration causes the movable contact of the potentiometer 59 to overshoot the neutral position (determined by the setting of the control potentiometer 58), thereby shifting the armature 50 out of its neutral position in direction to energize the opposite clutch. If the cam 54 is stopped in position to retain the contacts 51 and 52 in neutral position, the inherent overshooting of the shaft 22 and potentiometer 59 will oscillate the contact 50 back and forth between the contacts 51, 52 to produce a dither which, as in Figs. 1 and 2, is self-induced, and the frequency of the dither is the natural frequency of oscillation of the system. In some applications, the self-induced dither may be sufficient, and the cam 54 and motor may be omitted. In other applications, a forced dither at a frequency above the natural frequency of the system is necessary or desirable and can be obtained by forced oscillation of the switch contacts 51 and 52 by the cam 54, as described.

In Fig. 3, there are two controls; namely, the switch 31 and the control potentiometer 58. In most instances, the switch 31 would be positioned on the neutral contact 31b, and the movable contact of the potentiometer 58 would be externally shifted to effect controlled movement of the output shaft 22. However, by actuating the switch 31 onto either the contact 31a or the contact 31c, the output shaft 22 can be driven continuously in one direction or the other, as in Figs. 1 and 2.

Although for the purpose of explaining the invention a particular embodiment thereof has been shown and described, obvious modifications will occur to a person skilled in the art, and I do not desire to be limited to the exact details and described.

I claim:

1. An actuator comprising: a shaft rotatable in either direction from a neutral position; a rotary driving mechanism including a pair of selectively engageable clutches for driving said shaft in one direction in response to engagement of one clutch and in the other direction in response to engagement of the other clutch; first selectively energizable means for engaging one of said clutches to rotate said shaft in one direction; second selectively energizable means responsive to displacement of said shaft from neutral position in either direction by either clutch to disengage that clutch and engage the other clutch to dither the shaft back and forth through neutral position; and selecting means for selectively energizing either said first or said second means; the range of displacement of said shaft required to disengage either clutch and engage the other clutch being so small relative to the inertia of the shaft that the shaft accelerates substantially continuously in successively opposite directions while said second means is energized.

2. Apparatus according to claim 1 including a second shaft and speed-reducing coupling means coupling said second shaft to said first-mentioned shaft for rotation of said second shaft at a slower speed than the first shaft.

3. Apparatus according to claim 2 in which said coupling means comprises a gear train having limited lost motion no greater than the dithering movement of said shaft.

4. An actuator comprising: a shaft rotatable in either direction from a neutral position; a rotary driving mechanism including a pair of selectively engageable clutches for driving said shaft in one direction in response to engagement of one clutch and in the other direction in response to engagement of the other clutch; first selectively energizable means for engaging one of said clutches to rotate said shaft in one direction; second selectively energizable means responsive to displacement of said shaft from neutral position in either direction by either clutch to disengage that clutch and engage the other clutch to dither the shaft back and forth through neutral position; selecting means for selectively energizing either said first or said second means; and drag-brake means applying frictional resistance to rotation of said second shaft.

5. An actuator comprising: a first shaft; a second shaft; means coupling said shafts together for rotation of said shaft at a lesser speed than the first shaft, said shafts having coordinated neutral angular positions; a rotary driving mechanism including a pair of selectively engageable clutches for driving said shafts in one direction in response to engagement of one clutch and in the other direction in response to engagement of the other clutch; first selectively energizable means for engaging one of said clutches to rotate said shafts in one direction away from neutral position with a large range of displacement exceeding one revolution of said first shaft; second selectively energizable means actuated by and responsive to angular displacement of said first shaft from its neutral position in each direction within a small range less than one revolution of said first shaft, to selectively engage the appropriate clutch to return the first shaft through neutral position and thereby dither said shafts back and forth through neutral position; third selectively energizable means actuated by and responsive to displacement of said second shaft beyond said small range to engage the appropriate clutch to return said shafts toward neutral position and responsive to return of said shafts into said small range to energize said second means and transfer control of said clutches thereto; and means for selectively energizing said first and third means.

6. An actuator comprising: a shaft rotatable in either direction from a neutral position; a rotary driving mechanism including a pair of selectively engageable clutches adapted to be electrically energized for driving said shaft in one direction in response to engagement of one clutch and in the other direction in response to engagement of the other clutch; first selectively energizable means for engaging one of said clutches to rotate said shaft in one direction; second selectively energizable means responsive to displacement of said shaft from neutral position in either direction by either clutch to disengage that clutch and engage the other clutch to dither the shaft back and forth through neutral position; and selecting means for selectively energizing either said first or said second means; said second means comprising a current source, and double throw switch means operable between two positions to selectively connect said source to either clutch to engage it, and means for actuating said switch into position to reverse said shaft rotation in response to rotation of the shaft from neutral in either direction.

7. Apparatus according to claim 6 including means for selectively varying said neutral position.

8. Apparatus according to claim 6 including additional means for continuously actuating said switch between its two positions at a rapid rate.

9. An actuator comprising a shaft rotatable in either direction from a neutral position; a rotary driving mechanism including a pair of selectively engageable clutches for driving said shaft in one direction in response to engagement of one clutch and in the other direction in response to engagement of the other clutch; means for continuously and rapidly alternately engaging said two clutches to dither said shaft back and forth at a rapid rate; and means for selectively varying the periods of engagement of one clutch relative to those of the other clutch to cause the mean position of the shaft to progress in one direction.

References Cited in the file of this patent

UNITED STATES PATENTS

| | | |
|---|---|---|
| 1,091,653 | Hall | Mar. 31, 1914 |
| 2,462,393 | Haynes | Feb. 22, 1949 |
| 2,530,725 | Pizer | Nov. 21, 1950 |
| 2,590,029 | Minorsky | Mar. 18, 1952 |

FOREIGN PATENTS

| | | |
|---|---|---|
| 1,067,627 | France | June 17, 1954 |